United States Patent [19]

Carlson et al.

[11] Patent Number: 4,756,513

[45] Date of Patent: Jul. 12, 1988

[54] VARIABLE HYDRAULIC-ELASTOMERIC MOUNT ASSEMBLY

[75] Inventors: Eric D. Carlson, Xenia; Jack E. Smith, Huber Heights; Richard A. Muzechuk, Kettering, all of Ohio

[73] Assignee: General Motors Corporation, Detroit, Mich.

[21] Appl. No.: 929,328

[22] Filed: Nov. 10, 1986

[51] Int. Cl.[4] ..................... F16M 5/00; B60G 15/04
[52] U.S. Cl. ................. 267/140.1; 248/636; 267/195; 267/64.28
[58] Field of Search ............................. 248/636, 562; 137/533.19; 254/93 HP; 188/322.15, 322.13; 267/195, 140.1, 64.28, 118, 122

[56] References Cited

U.S. PATENT DOCUMENTS

| | | | |
|---|---|---|---|
| 4,294,141 | 10/1981 | Miller | 254/93 HP |
| 4,415,148 | 11/1983 | Mair et al. | 267/122 |
| 4,664,360 | 5/1987 | Sciortino | 267/140.1 |
| 4,664,363 | 5/1987 | Gold et al. | 248/636 |
| 4,679,777 | 7/1987 | Gold et al. | 248/636 |

FOREIGN PATENT DOCUMENTS

| | | | |
|---|---|---|---|
| 0077195 | 4/1983 | European Pat. Off. | 267/140.1 |
| 3210731 | 10/1983 | Fed. Rep. of Germany | 267/140.1 |
| 3447746 | 7/1986 | Fed. Rep. of Germany | 267/140.1 |
| 0231235 | 12/1984 | Japan | 267/140.1 |
| 0175834 | 9/1985 | Japan | 267/140.1 |
| 2041488 | 9/1980 | United Kingdom | 267/140.1 |

Primary Examiner—Andres Kashnikow
Assistant Examiner—Mark T. Le
Attorney, Agent, or Firm—R. L. Phillips

[57] ABSTRACT

A hydraulic mount assembly is disclosed having a partition including a hydraulic damping decoupler between two hydraulic chambers. One chamber is formed by an elastomeric member and the other by a resilient diaphragm. During dynamic loading of the mount, fluid passes between the two chambers of the mount causing expansion and contraction of the diaphragm. A pneumatic bladder is positioned to exert external pressure against the diaphragm in order to change the damping characteristics of the mount. As the bladder is expanded, the diaphragm is stiffened and the fluid flow between the two chambers in the hydraulic mount is restricted. When the bladder is deflated, the pressure against the diaphragm is reduced or effectively removed thereby restoring full freedom of movement of the fluid in the hydraulic mount. By actively controlling the diaphragm expansion in this manner, the dynamic characteristics of the mount are varied. A control circuit with on-board transducers is provided to monitor vehicle operating and road response conditions and modulate the pressure to the bladder for maximum damping effect. The on-board transducers sense selected parameters to indicate unusual conditions for which modulation is required, such as rough engine operation, engine lugging, rough road conditions, sudden turning and/or rapid acceleration/deceleration.

2 Claims, 2 Drawing Sheets

VARIABLE HYDRAULIC-ELASTOMERIC MOUNT ASSEMBLY

TECHNICAL FIELD

The present invention relates generally to hydraulic mounts for vibration damping and, more particularly, to a hydraulic mount assembly designed to provide infinitely variable damping characteristics.

BACKGROUND OF THE INVENTION

A variety of mount assemblies are presently available to isolate vibrations on automobile and truck engines and transmissions. One of the most popular mounts today is the hydraulic-elastomeric mount. An example of such a mount is shown in U.S. patent application Ser. No. 785,243, filed Oct. 7, 1985 and entitled "Hydraulic-Elastomeric Mount Displacement Decoupler".

The hydraulic mount assembly disclosed in this patent application includes a molded, hollow rubber body that is closed by a resilient diaphragm so as to form a cavity. This cavity is partitioned by a plate into two chambers that are in fluid communication through an orifice in the plate. A primary chamber is formed between the plate and the body and a secondary chamber is formed between the plate and the diaphragm.

A decoupler is mounted in the plate so as to reciprocate and thereby produce small volume changes in the two chambers. When, for example, the decoupler moves toward the diaphragm, the volume of the primary chamber increases and the volume of the secondary chamber decreases. In this way, at certain small vibratory amplitudes and high frequencies, fluid flow between the chambers through the orifice is avoided and undesirable hydraulic damping is eliminated. In effect, this decoupler is a passive tuning device that enhances the performance capability of the mount.

The orifice is formed to extend in a track around the perimeter of the orifice plate. Each end of the track has one opening, one communicating with the primary chamber and the other to the secondary chamber. The orifice track provides the hydraulic mount assembly with another passive tuning component, and when combined with the decoupler provides at least three distinct modes of operation that exhibit different dynamic characteristics. The operating mode is primarily determined by the flow of the fluid between the two chambers. Small amplitude vibrating inputs produce no damping due to decoupling, as described above. Secondly, large amplitude vibrating inputs from the engine produce high velocity fluid flow through the orifice track. The resulting high level of damping force and smoothing action creates another operation mode of the mount. Conversely, medium amplitude inputs produce lower velocity fluid flow in the mount resulting in a medium level of damping.

While the three distinct modes of operation provided by present hydraulic mounts thus provide generally satisfactory operation, they are not sufficient to furnish the desired damping and noise suppression under all the continuously varying conditions encountered during vehicle operation. More specifically, certain circumstances such as engine lugging, rough road conditions, sudden turning and/or rapid acceleration or deceleration produce vibrations of both varying frequency and amplitude that simply cannot be properly isolated by a mount assembly providing only limited modes of operation. A need is therefore identified for a hydraulic mount assembly that provides for an active or variable control of the dynamic characteristics. These dynamic characteristics of the mount can then be tuned, either manually or automatically, to provide the most effective and efficient damping and noise suppression over the entire range of expected operating conditions.

SUMMARY OF THE INVENTION

Accordingly, it is a primary object of the present invention to provide an improved hydraulic mount assembly overcoming the above-described limitations and disadvantages of the prior art limited to passive tuning concepts.

An additional object of the present invention is to provide a hydraulic mount assembly with active tunable dynamic characteristics.

Another object of the present invention is to provide a hydraulic mount assembly that is infintely tunable to more efficiently and effectively isolate vibrations and suppress noise under the full range of vehicle operating and road conditions.

Still another object of the present invention is to provide a reliable hydraulic mount assembly of simple construction and that is inexpensive to build and capable of furnishing infinitely variable dynamic characteristics.

A further object of the present invention is to provide a hydraulic mount that allows the dynamic characteristics to be actively controlled by varying the flow of fluid between the two chambers of the mount assembly.

According to the present invention, these objectives are accomplished by controlling diaphragm expansion so that for a given force of a certain amplitude and frequency a different amount of fluid is displaced. Thus, the damping characteristics of the assembly may be actively tuned as required for maximum vibration isolation, and consequently a smoother, quieter ride.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an actively tunable hydraulic mount assembly is provided for damping and isolating engine and transmission vibrations. The preferred embodiment of the mount assembly selected to illustrate the invention employs the basic structure including the passive tuning features shown in the copending application, Ser. No. 785,243, referred to above. In particular, the mount assembly includes a pair of mounting members embedded in a hollow elastomeric body of natural or synthetic rubber. This hollow body is closed by a resilient diaphragm so as to form a cavity for a damping liquid, which may be a commercial engine antifreeze coolant. A partition or plate is provided to divide the fluid filled cavity into two distinct chambers. The primary chamber is formed between the partition and the interior wall of the hollow body. The secondary chamber is formed between the partition and the interior wall of the diaphragm.

The partition further includes the decoupler and the track-like orifice connecting the two chambers. Certain engine vibration forces within the design amplitudes and frequencies of the mount produce a contraction of the hollow body and primary chamber. Upon contraction (compression), the liquid either causes reciprocation of the decoupler, or is forced from the primary chamber through the orifice at the design rate into the secondary chamber. The latter action, when it occurs, causes stretching of the diaphragm defining the secondary chamber. Then upon reversal of the force resulting in expansion of the primary chamber, the stretched diaphragm contracts forcing liquid back through the orifice to complete the damping cycle.

In addition to the above basic structure, the mount assembly of the invention is characterized by an active tuning concept in the form of variable control means for restricting or controlling diaphragm expansion. In this way the flow of damping liquid between the two chambers may be infinitely varied or adjusted and the dynamic characteristics of the mount assembly thereby actively tuned to particular design parameters desired.

Of particular significance, the control means may be utilized to actively restrict the diaphragm movement in response to vibration being produced at any given time under any given vehicle operating and road conditions. Thus, the mount assembly is not only advantageously infinitely variable, but may be directly responsive to vehicle mounted transducers so as to more efficiently and effectively isolate vibrations. This active control means for the mount of the invention is highly effective over a broader range of amplitudes and frequencies than previously attainable.

Preferably, the means for restricting diaphragm expansion is an expandable bladder connected to and in communication with a variable pressure fluid supply, such as a conventional air pump and reservoir. This bladder is positioned within a space in the assembly between the diaphragm and the enclosing mounting member. Input of pneumatic pressure causes the bladder to swell and expand toward and engage the face of the diaphragm. Thus, the diaphgram is restricted in its expansion and stiffened, and fluid flow between the two chambers in response to a given amplitude and frequency of vibration is altered. As such, the dynamic characteristics of the assembly may be actively adjusted or tuned to provide the desired vibration isolation in response to any particular vehicle operating conditions that can be expected to occur, or alternatively, that do occur during operation.

Of course, while an expandable bladder is preferred, it should be appreciated that in accordance with the broader aspects of the invention, other means may be used to actively tune or control diaphragm expansion. For example, the space between the diaphragm and the mounting member of the assembly could be sealed and directly connected to a pressurized fluid supply. Varying fluid pressure is then applied directly to the face of the diaphragm. Alternatively, a pressure plate could be provided in this space. A mechanical linkage, including a rack and pinion, cam, wedge and/or lever is then provided to bring the plate in position to engage the diaphragm.

In accordance with another aspect of the present invention, a particularly advantageous approach is taken to assure that the dynamic characteristics of the mount assembly may be efficiently tuned in direct response to the varying operating and road conditions, that is simultaneously as they are encountered by the vehicle and without operator intervention. Specifically, a control circuit, including a microprocessor and associated on-board sensors or transducers, is provided. The transducers sense selected parameters, such as engine vibration amplitude and frequency that change, for example, when the engine is idling, lugging or being rapidly accelerated. The transducers indicate these vibration conditions to the microprocessor that is preprogrammed to then modulate the fluid pressure of the expandable bladder by means of the variable pressure source. In this way diaphragm expansion may be restricted and dynamic characteristics of the assembly automatically controlled and actively tuned to provide maximum damping effect and noise suppression for a smoother and quieter operation of the engine.

In accordance with yet another aspect of the present invention, the assembly may also include a feature allowing active control of the decoupler by the diaphragm. As indicated, the decoupler is mounted for limited free reciprocal movement in the partition between the two chambers. Specifically, the decoupler reciprocates between the chambers in response to and absorbing the small amplitude fluid pressure buildups in the chambers. In accordance with the invention, the bladder can be sufficiently expanded toward the diaphragm to bring the diaphragm into positive engagement with the decoupler. In this way, not only is the diaphragm stiffened to the limit, but also the operation of the decoupler is disabled so as to provide the mount assembly with maximum damping even at low amplitudes.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and together with the description serves to explain the principles of the invention. In the drawing.

DETAILED DESCRIPTION OF THE INVENTION

Figure 1:
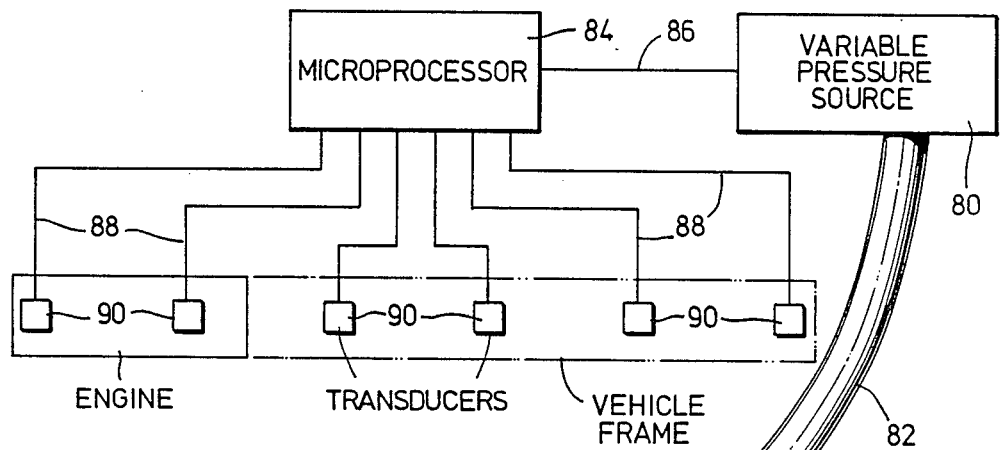
FIG. 1 is a schematical representation of the control circuit and expandable bladder of the hydraulic mount assembly of the present invention.

Reference is now made to the drawing showing the improved hydraulic-elastomeric mount assembly of the present invention particularly adapted for mounting an internal combustion engine in a vehicle. The dynamic characteristics of the mount assembly may be adjusted or tuned to meet the specific application. As a result, the desired amplitude control, as well as the coefficient of damping and resulting dynamic rate best suited to isolate a particular set of vibration conditions, can be obtained.

The mount assembly includes a cast aluminum mounting member 10 and stamped sheet metal mounting member 12. The mounting members 10 and 12 each have a pair of studs 14, 16, respectively. These studs 14, 16 project outwardly from the mounting members 10, 12 for attachment respectively to an engine (not shown) and an engine supporting cradle or frame of a vehicle (not shown).

A hollow elastomeric body 18 interconnects the mounting members 10, 12. The body 18 is constructed of natural or synthetic rubber. More specifically, the body 18 may be molded to and about the mounting member 10 and to both the interior and exterior of an oval-shaped stamped sheet metal retainer 20.

The body 18 is configured and defines a hollow cavity 22 for receiving a damping liquid such as commercial engine antifreeze coolant. Oppositely located voids 24 are formed in the body 18 between the mounting member 10 and the retainer 20. These voids 24 provide directional dynamic rate control within the elastomeric body 18 itself and is a part of the damping liquid cavity 22. As is known in the art, such voids 24 are especially useful in isolating certain internal combustion engine vibrations. This particular structure is representative of still another type of limited, passive tuning of hydraulic mounts that is available.

Together, the mounting member 10, elastomeric body 18 and metal retainer 20 form a first subassembly or cover of the mount assembly. The retainer 20 includes an outwardly projecting collar 26 at its lower periphery. The collar 26 is formed to receive a second subassembly or base. This second subassembly comprises the mounting member 12 and elastomeric diaphragm 28 of natural or synthetic rubber, a partition 30 with the flow orifice and a damping decoupler 32.

The elastomeric diaphragm 28 includes an annular rim section 34 having a radially inwardly facing internal groove formed between upper and lower shoulders 38, 40 respectively. The shoulders 38, 40 are flexible so as to receive the periphery of the partition 30. Thus, the periphery of the partition 30 is sealingly engaged by the shoulders 38, 40 on opposite sides of the groove.

The lower mounting member 12 is formed with a collar to receive the rim of the diaphragm 28. The collar of the mounting member 12 fits within the collar 26 of the retainer 20. As is known in the art, tabs (not shown) may be provided on the collar 26 and bent over to retain the whole mount assembly together.

The elastomeric diaphragm 28 closes the elastomeric body 18 so as to form therewith the closed damping cavity 22. This cavity 22 is divided by the partition 30 into a primary chamber 46 enclosed by the elastomeric body 18 and a secondary chamber 48 enclosed by the diaphragm 28.

Figure 2:
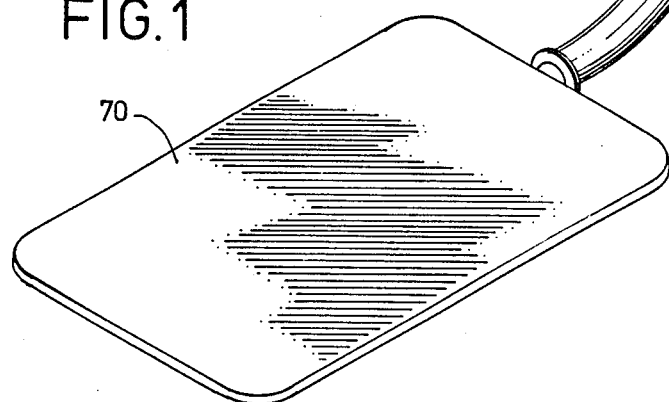
FIG. 2 is a cross-sectional view of the hydraulic mount assembly with the expandable bladder relatively deflated to allow substantially free movement of the diaphragm.
Figure 2:
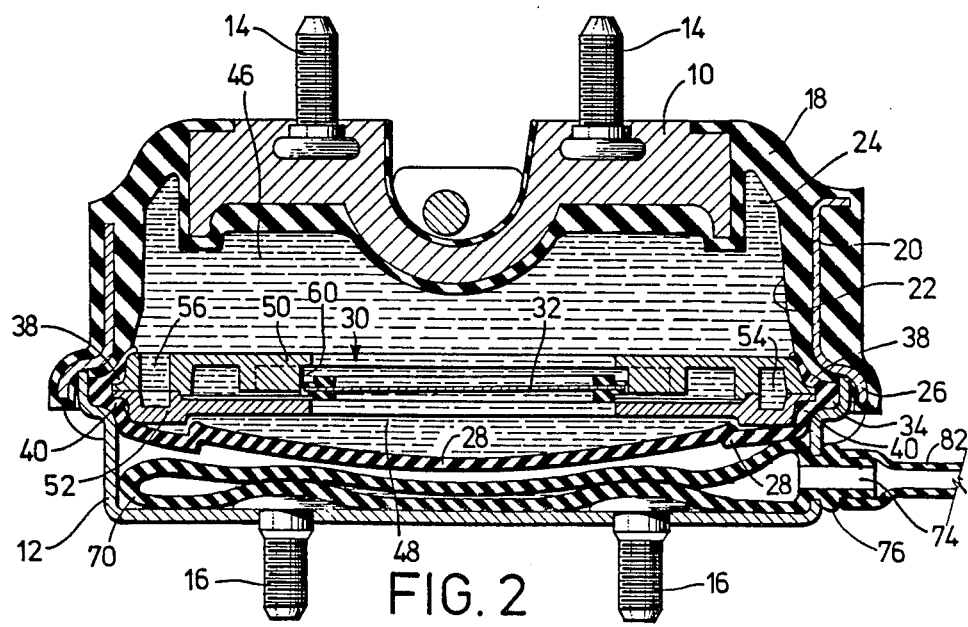
Figure 3:
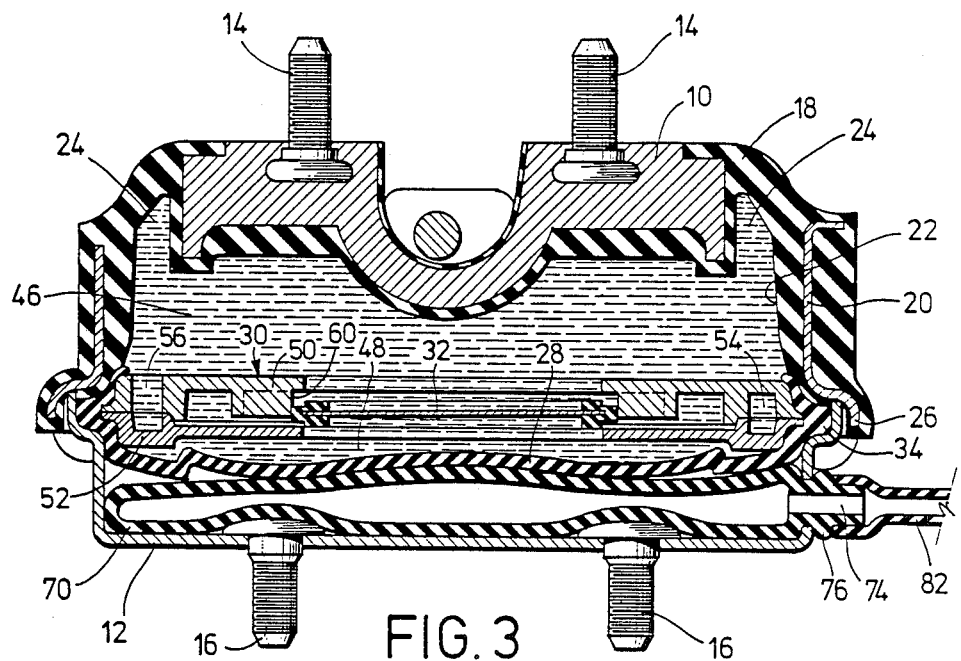
FIG. 3 is another cross-sectional view showing the expandable bladder in a partially inflated, intermediate position for partially restricting the movement of the diaphragm.
Figure 4:
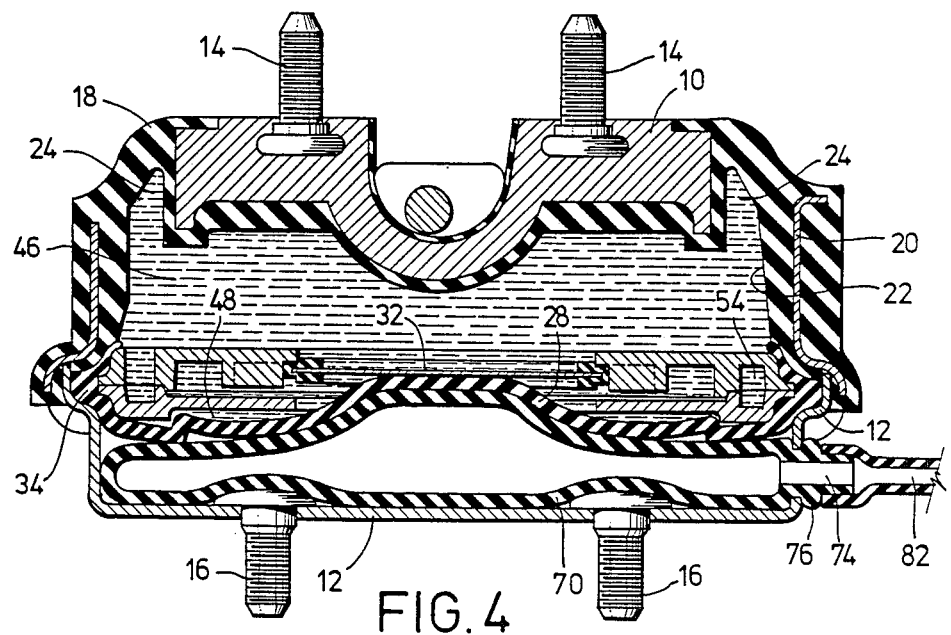
FIG. 4 is an additional cross-sectional view of the hydraulic mount assembly showing the bladder fully expanded and forcing the diaphragm to engage the decoupler so as to provide maximum diaphragm restriction and to disable operation of the decoupler.

The partition 30 is formed of die cast metal as shown or may be plastic; and includes a pair of plates 50, 52 with matching peripheries. As shown in FIGS. 2-4, these plates span the cavity 22 and cooperate to define an extended damping orifice 54 interconnecting the chambers 46, 48. One opening 56 is provided at the one end of the orifice 54 in the plate 50 through which the orifice communicates with the primary chamber 46 (see FIG. 3). A similar opening (not shown) is provided in the plate 52 at the opposite end of the orifice 54 for communication between the orifice and the secondary chamber 48. Thus, the orifice 54 interconnects the chambers and may be formed to a selected length.

When a vibratory input is provided to the mount assembly, liquid flows through and around the extended orifice 54. The fluid exchange between the primary and secondary chambers 46, 48 produces the passively tuned damping effect due to the designed resonance of the column of liquid in the orifice 54. The increased resistance to flow along the orifice and the inertial effects of the liquid column provides this proven prior art tuning action.

In operation, and assuming first a compressive force from vibratory action being impressed across mounting members 10, 12, there is a contraction of the primary chamber 46. As this occurs, the liquid therein is forced to flow through the orifice 54 into the chamber 48. The chamber 48 then expands as permitted by the elasticity of the diaphragm 28. On reversal of vibratory force, that is release of the compressive force, the memory of the elastomeric body 18 and the diaphragm 28 causes the primary chamber 46 to expand and the stretched diaphragm 28 to retract. The contraction of the secondary chamber 48 forces the damping liquid back through the orifice 54 and into the primary chamber 46 to complete the damping cycle.

The hydraulic damping decoupler 32 is known in the art and fully described in the previously referenced copending patent application, is simply a rectangular plate that is formed of metal as shown or plastic. An elastomeric ring cushion formed of natural or synthetic rubber is molded to the decoupler 32 about the perimeter thereof. The decoupler 32 is mounted for limited up and down reciprocal movement in a cavity 60 that is formed between the partition plates 50, 52. The respective upper and lower faces of the decoupler 32 are directly engaged by the damping liquid within the primary and secondary chambers 46, 48.

The decoupler 32 provides another passive tuning component of the mount assembly by effectively eliminating hydraulic damping below a prescribed low amplitude of vibration. Specifically, the decoupler 32 provides reciprocating movement in response to alternating pressure build-ups in the chambers 46, 48 acting on opposite faces of the decoupler. The reciprocating movement of the decoupler within the plates 50, 52 toward and away from the chambers 46, 48 produces a limited volume change in the chambers that effects hydraulic decoupling.

From the above description of the basic mount assembly, it is clear that there are several passive tuning concepts employed, all of which are capable of working in concert to give improved results for a selected vehicle application. In contrast, our discovery provides for active tuning of the damping characteristics, and depending on the selected application are capable of either replacing this prior art structure or working in concert with it to enhance the results. Thus, as will be more fully described below, and in accordance with the broad aspects of the present invention, the overall dynamic characteristics of the mount assembly are actively tuned to damp vibration at any particular amplitude and frequency produced during vehicle operation. In short, to achieve this result, the flow of damping liquid between the two chambers 46, 48 is infinitely varied by restricting expansion of the diaphragm 28.

To achieve this purpose, an expandable bladder 70 is provided in the space between the base plate of the mounting member 12 and the diaphragm 28. As shown in FIGS. 2–4, the bladder 70 is designed to be inflated to an infinitely variable degree within the space. The bladder 70 includes a nipple 74 that extends through an opening in the side of the mounting member 12. A retaining bead 76 extending around the nozzle 74 engages the exterior face of the mounting member 12 adjacent the opening. The bead 76 maintains the bladder 70 in proper position. The mounting member 12 remains unsealed so that the diaphragm 28 is exposed to ambient pressure and the basic damping characteristics are unchanged.

As shown schematically in FIG. 1, the bladder 70 is connected in fluid communication with a variable pneumatic pressure source 80 by means of tubing 82. Operation of the pressure source 80, which may include an air pump and reservoir, is controlled by a microprocessor 84 through line 86. The microprocessor 84 is connected through lines 88 to a series of transducers 90. The transducers 90 are mounted on board the vehicle, such as on the engine and the frame of the vehicle at various locations in order to instantaneously sense vibration amplitude and frequency during operation. To be more specific, transducers 90 may be strain gauges and positioned in engagement with the engine block and frame(-See FIG. 1) adjacent the mount assemblies. These transducers 90 sense the varying amplitude and frequency of engine vibrations produced during, for example, idling, rapid acceleration and deceleration, highway cruising and engine lugging.

The information relative to vibration amplitude and frequency that is sensed by the transducer 90 is immediately communicated along the lines 88 to the microprocessor 84. The information is then processed and a preprogrammed response output signal is communicated along line 86 to the variable pressure source 80. Specifically, the fluid pressure to the bladder 70 is modulated and either increased or decreased as required to produce the most effective damping and isolation of engine vibrations for the smoothest possible ride.

As shown in FIG. 2, the bladder 70 is deflated or contracted by the microprocessor 84 in response to low vibration frequencies and amplitudes sensed by the transducers 90, such as during engine idling. The contraction of the bladder 70 leaves a defined air space between the upper face of the bladder and the central portion of the diaphragm 28. The diaphragm thus is allowed substantially unrestricted freedom of movement. Fluid flow between the chambers 46, 48 in response to vibration inputs is therefore also substantially unrestricted and the mount assembly exhibits relatively soft damping qualities.

When, for example, the engine is then accelerated rapidly from idle, the frequency and amplitude of engine vibrations are increased. The transducers 90 continuously sense the changes in these conditions and provide the information to the microprocessor 84. The microprocessor 84 processes the information and sends a response signal to the variable pressure source 80 to increase the pressure to the bladder 70 through the tubing 82. Specifically, the pressure to the bladder expands the bladder (FIG. 3) and moves the face of the bladder against the diaphragm 28. Thus, the diaphragm is stiffened. This results in the restriction of diaphragm expansion, and consequently restricts fluid flow between the chambers. As a result, the mount assembly exhibits relatively stiffer qualities than when in the mode shown in FIG. 2. The mount assembly provides increased damping characteristics for accommodating vibration of increased amplitude. Also, the changed dynamic characteristics result in peak damping levels now being produced at slightly higher frequencies so as to provide more effective isolation of engine vibrations produced under the conditions mentioned.

During certain other operating conditions, such as under hard cornering or engine lugging, the mount assembly preferably exhibits peak damping levels at high amplitudes and low frequencies. Upon sensing such conditions, the microprocessor 84 directs the variable pressure source 80 to fully expand the bladder 70, as shown in FIG. 4. When fully expanded the bladder 70 further restricts and thus stiffens the diaphragm 28, and in addition forces the central portion of the diaphragm 28 actually into contact with the decoupler 32 thereby effectively disabling its operation. In this configuration the mount assembly exhibits the stiffest qualities. Fluid flow between the chambers 46, 48 through the orifice 54 is more fully restricted so as to produce a large damping effect at the high amplitudes and low frequencies necessary to isolate, for example, engine lugging vibrations.

Of course, in between the three conditions of inflation of the bladder 70 shown in FIGS. 2-4 are an infinite number of control variations, so that in effect the restriction of the diaphragm is infinitely variable. This feature of active control allows the mount assembly of the invention to respond to virtually all conditions of vibrations that might be encountered for maximum damping action.

In summary, numerous benefits result from employing the concepts of the present invention. The hydraulic mount assembly incorporates an expandable bladder 70 that is positioned adjacent to the diaphragm 28 so as to allow the expansion characteristics of the diaphragm to be restricted. This in turn serves to restrict fluid flow through the orifice 54 between the primary chamber 46 and the secondary chamber 48. Specifically, by modulating the fluid pressure within the bladder 70, the damping characteristic of the assembly is actively tuned so as to best dampen troublesome vibrations occurring during any particular operating conditions. Transducers 90 may be provided to instantaneously sense the amplitude and frequency of vibrations being produced at any given time. A preprogrammed microprocessor 84 is provided to process the information from the transducers 90. The microprocessor 84 operates through a pressure source to vary the fluid pressure of the bladder 70 and automatically produce the most effective and efficient damping and vibration isolation.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly legally and equitably entitled.

The embodiments of the invention in which an exclusive property or privilege is claimed are defined as follows:

1. A hydraulic mount assembly providing variable damping characteristics, comprising:
    a pair of mounting members;
    a hollow body connected to said mounting members;
    a resilient diaphragm closing said hollow body and forming therewith a closed cavity that is filled with liquid;
    means partitioning said cavity into a primary chamber and a secondary chamber enclosed by said diaphragm;
    an orifice connecting said chambers so as to effect damping;
    a damping decoupler means mounted for free limited reciprocal movement in said partition and exposed on opposite sides to said chambers so as to effect cyclic volume change in said chambers in response to alternating pressure buildup therein to thereby prevent forcing of the liquid through said orifice below a prescribed amplitude level of relative vibration of said mounting members; and characterized by
    active control means for restricting the expansion of said diaphragm and stiffening same and for additionally acting through said diaphragm to positively prevent movement of said decoupler means, whereby the damping characteristics of said mount assembly may be varied as desired including disabling said decoupler means.

2. The hydraulic mount assembly as set forth in claim 1, wherein said active control means comprises an inflatable bladder mounted on one of said mounting members for engagement with said diaphragm; and a variable pneumatic pressure source connected to said bladder to provide infinitely variable inflation thereof.

* * * * *